United States Patent [19]

Vinup

[11] Patent Number: 4,605,374
[45] Date of Patent: Aug. 12, 1986

[54] DEMONSTRATOR FOR TEACHING PRESSURE BLOW FORMING OF PLASTICS

[76] Inventor: Karl J. Vinup, 1535 N. 26th St., Allentown, Pa. 18104

[21] Appl. No.: 757,510

[22] Filed: Jul. 22, 1985

[51] Int. Cl.⁴ .............................................. G09B 25/02
[52] U.S. Cl. ..................................... 434/365; 434/219
[58] Field of Search ................................ 434/219, 365

[56] References Cited

U.S. PATENT DOCUMENTS 3,891,369  6/1975  Pracilio ........................... 434/219 X Primary Examiner—Harland S. Skogquist
Attorney, Agent, or Firm—Ruth Moyerman

[57] ABSTRACT

A device for teaching the art of blow form molding of plastics is disclosed. The teaching device is portable and sealable, having a housing with a lid. Pressurized gas enters the housing and is directed through an orifice in a housing shelf upward into the lid. Starter plastic is placed on the shelf. A mold is held in the lid and the plastic assumes the shape of the mold as it is blown upward through the orifice into the lid. The lid has a central opening to allow the students to see the process of blow forming of plastics as it occurs. The device has a carrying handle, flanges to fasten it to a work surface, and locking toggle handles to assure a tight seal of lid and housing.

16 Claims, 8 Drawing Figures

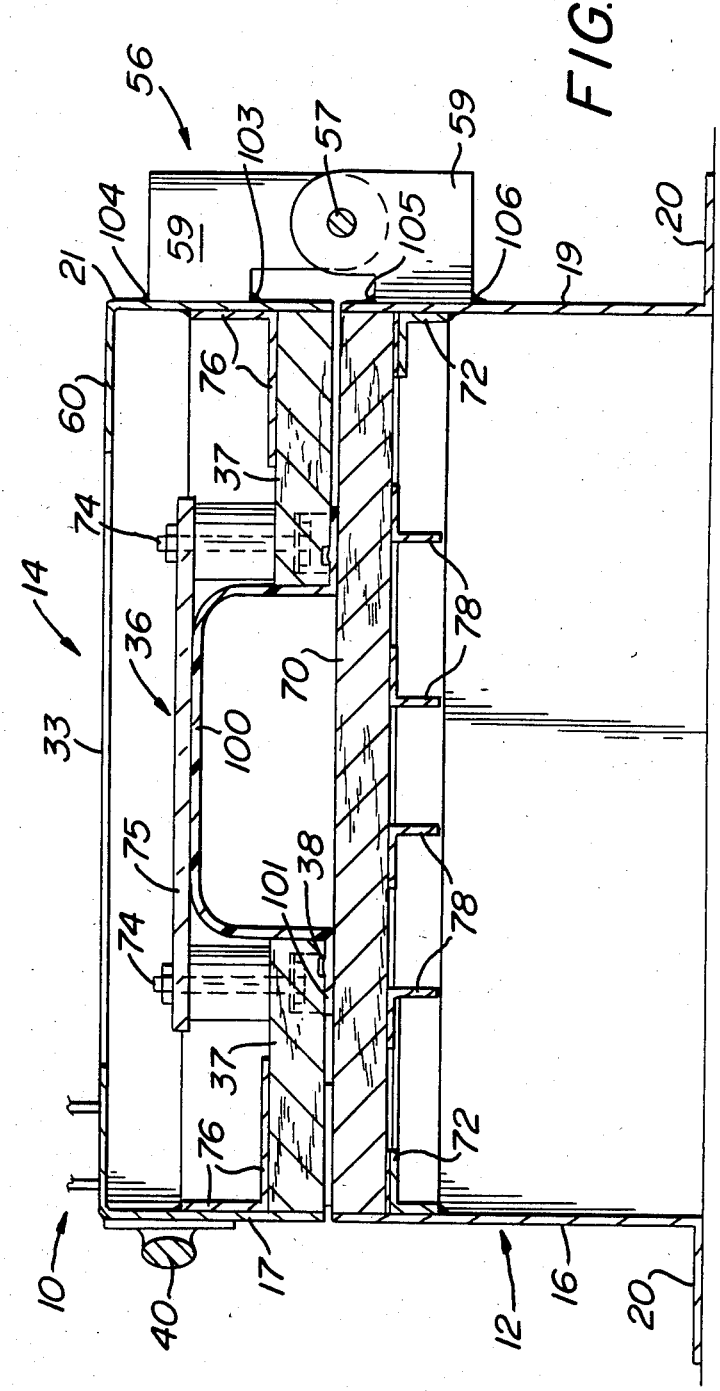
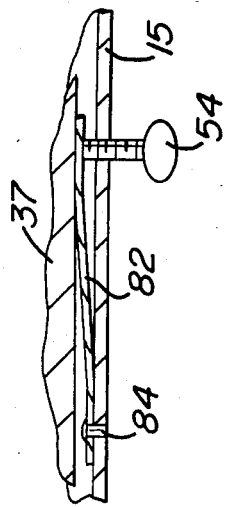
FIG. 4
FIG. 5

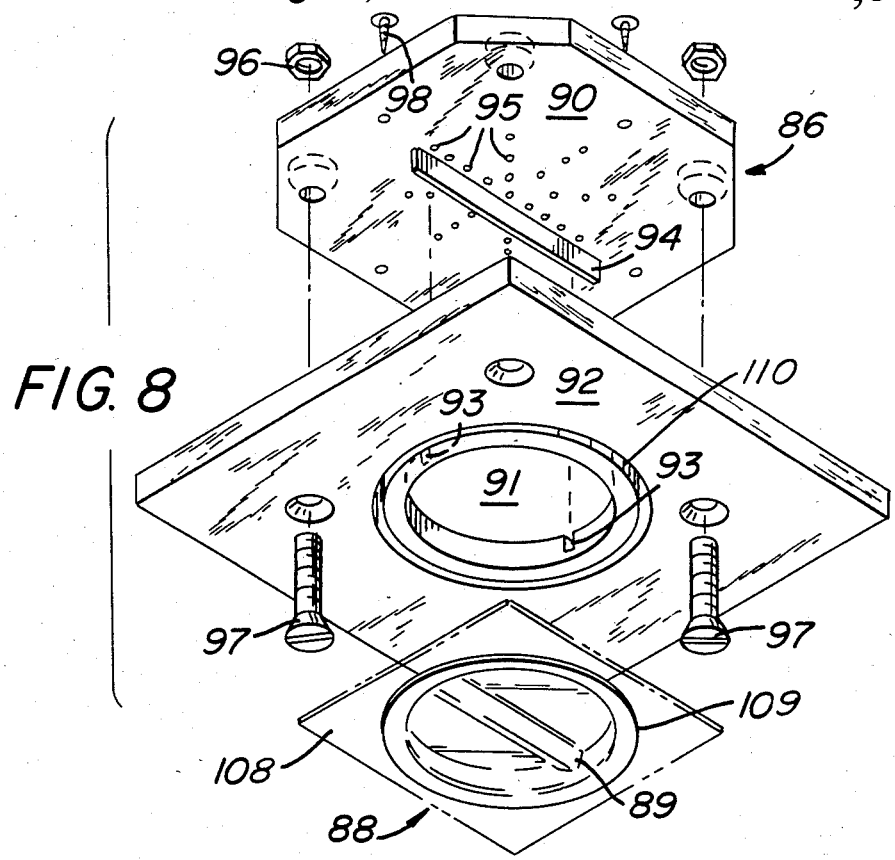
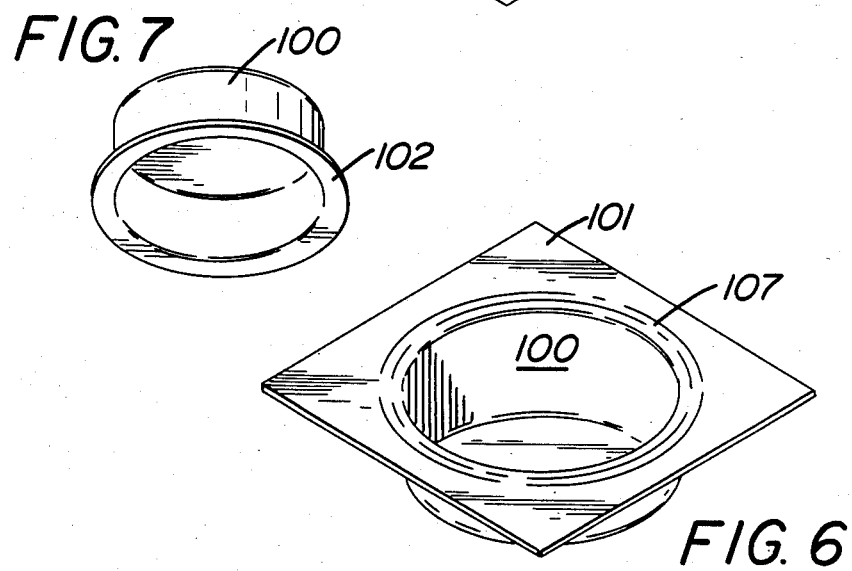

4,605,374

DEMONSTRATOR FOR TEACHING PRESSURE BLOW FORMING OF PLASTICS

BACKGROUND OF THE INVENTION

1. Field of the Invention

This invention relates to teaching devices and more particularly to a device to teach the art of pressure blow forming of plastics.

2. Description of the Prior Art

There are many devices used in the classroom to teach the principles involved in the forming of plastics. A teacher may use charts, film strips, books, lectures, and other methods to explain the process to his students. Yet, the most effective method of all, hands on experience, has not been available without taking the class to an industrial plant. Even at the plant, it is unlikely that the students would be able to perform the operations of blow forming of plastic for themselves. It is not within the financial resources of most educational facilities to provide industrial size equipment for the use of their students. Therefore, there is a need for a classroom sized, portable demonstrator which uses readily available compressed air in tanks to teach the art of pressure blow forming of plastics. There is a need for a demonstrator of that art which may be used by the instructor to teach the art and then be used by the students to practice the art. There is presently no device on the market which provides a countertop demonstrator which is both safe and simple to use in the teaching of the art of pressure blow forming of plastics.

SUMMARY OF THE INVENTION

The aforementioned prior art problems are overcome by the teaching device of ths invention by which the art of blow forming of plastics is demonstrated. The demonstrating device of this invention has a generally parallelpipedal sealed housing and lid, the lid being adapted to receive a mold. The housing includes inwardly disposed shelf supports for a transverse planar shelf, the latter having a central orifice. Gas delivery means, preferably tubing, leads from the orifice underneath the shelf to an aperture in one of the housing sides where it is coupled to a nozzle. The nozzle accepts a source of pressurized gas. Gas enters the tubing and is directed upward vertically through the shelf orifice to blow softened plastic starting material on the shelf over the orifice into the lid retained mold to form a finished workpiece.

It is, therefore, an object of this invention to provide a device to be used by an instructor to teach the art of blow forming of plastics.

It is still another object of this invention to provide a device which is portable and may be used on a work table top.

It is a further object of this invention to provide a device which uses readily available pressurized gas to blow the plastic.

It is yet another object of this invention to provide a device which requires no electricity to operate.

It is a further object of this invention to provide a device which may use a variety of molds to produce a variety of finished work pieces.

It is yet a further object of this invention to provide a device which allows the student to observe the art of blow forming of plastics through an opening in the lid.

These and other objects will be more readily ascertainable to one skilled in the art from a consideration of the following Figures, description and examplary embodiments.

BRIEF DESCRIPTION OF THE DRAWINGS(S)

FIG. 4 is a cross section taken on lines 4—4 of FIG. 3.

Figure 1:
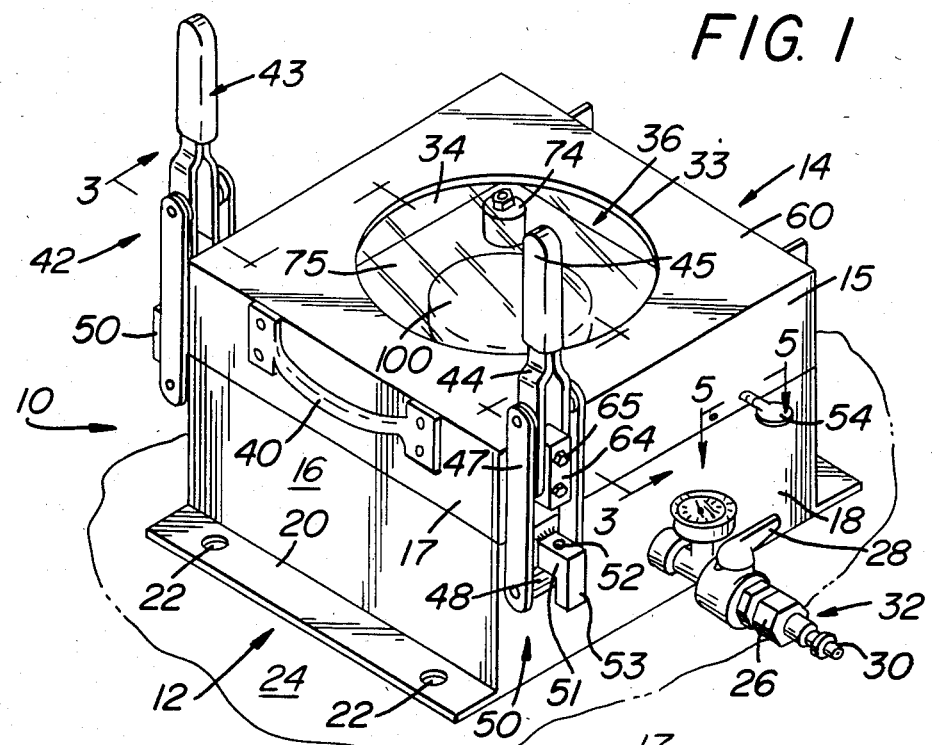
FIG. 1 is an isometric view of the invention with the lid closed, a mold in place, and a finished workpiece inside the mold.

FIG. 5, taken on lines 5—5 of FIG. 1, shows a set screw and spring plate used to hold the mold in place.

FIG. 6 is an isometric view of a finished workpiece formed from the mold shown in FIG. 1.

FIG. 7 shows the workpiece of FIG. 6 after it has been trimmed.

FIG. 8 is an exploded view of an alternate mold and the finished workpiece from that mold.

DETAILED DESCRIPTION OF THE PREFERRED EMBODIMENT(S)

Referring now to the drawings, and more particularly to FIG. 1, teaching device 10 is shown with lid 14 in place on housing 12. Lid 14 is shown including mold 36 with finished workpiece 100 in place. Housing 12 has sides 16 and 18. Extending from side 16 is flange 20 with apertures 22. When fastening devices are inserted through apertures 22, device 10 is secured on a surface 24. Teaching device 10 is intended to be portable for use in the classroom, yet the instructor may desire to ensure its stability by fastening it to a worktable when using it with students. Teaching device 10 is easily removed from work surface 24 when the teaching unit is completed by removing the fasteners from apertures 22.

Figure 3:
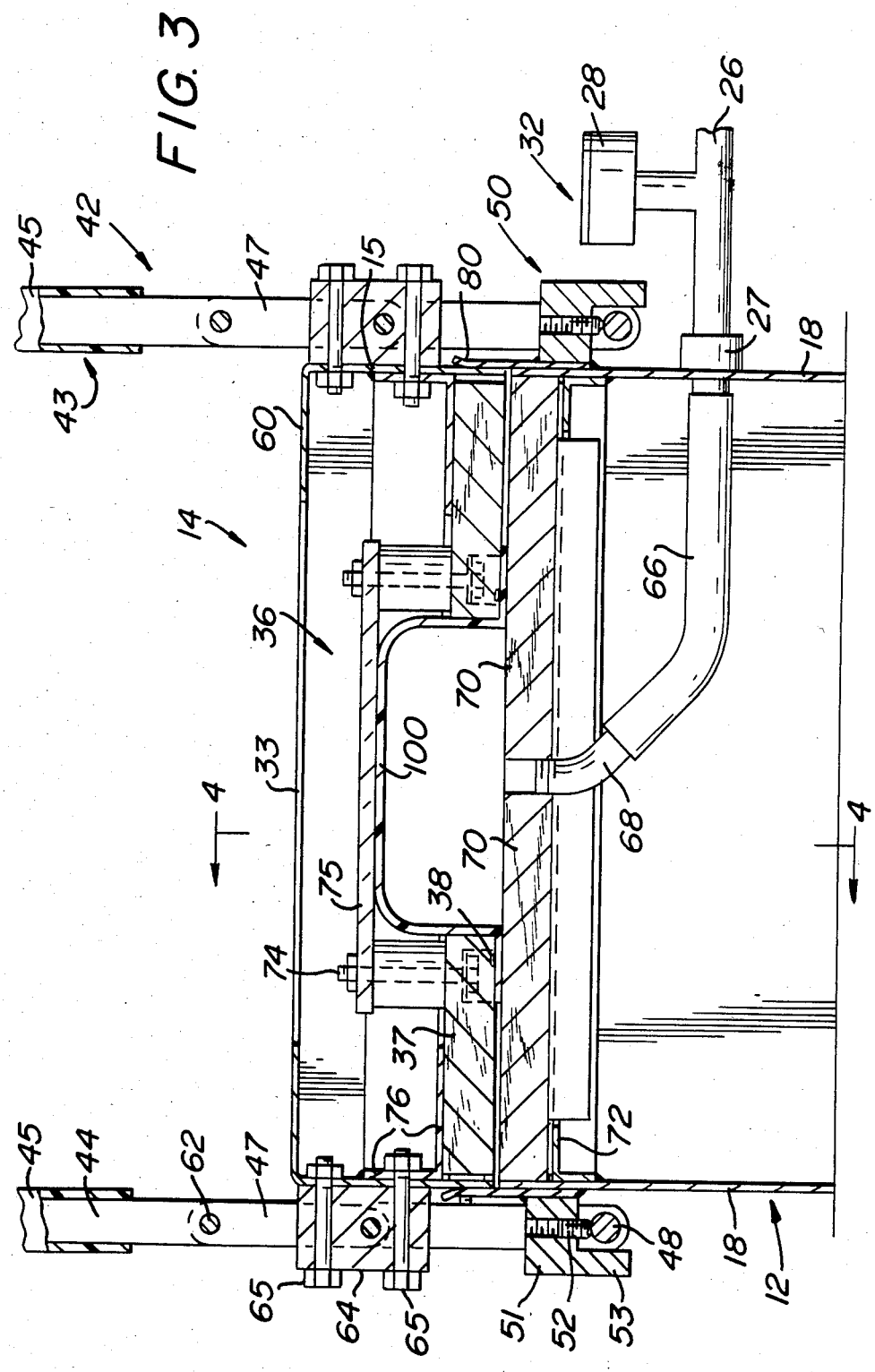
FIG. 3 is a cross section taken on lines 3—3 of FIG. 1.

In FIG. 1, lid 14 is illustrated with lid top 60 having opening 34 with perimeter 33. Opening 34 allows the students to look into teacing device 10 while work is in progress to see a workpiece being formed. Seen through opening 34 is mold 36 with workpiece 100 formed in it. Mold 36 has two parallel boards, transparent board 75 and base board 37 (unseen) between which workpiece 100 is formed. Base board 37 is seen in FIGS. 3 and 4. Bolts 74 hold base board 37 to transparent board 75 at a distance which determines the depth of the workpiece to be formed therebetween. The formation of a workpiece is best explained with reference to FIGS. 3,4,7 and 8.

Also seen in FIG. 1 attached to lid front 17 is lifting handle 40 which enables the demonstrator to carry this portable device from one location to another.

FIG. 1 provides a view of handle and latch assembly 42 which acts as a toggle lock to seal lid 14 on housing 12. Assembly 42 includes handle 43 and latch 50. Handle 43, attached to lid sides 15 has parallel legs 44, upright 45, and handle leg extensions 47 with crosspiece 48. Handle 43 is attached to sides 15 by bracket 64 with bolts 65. L-shaped latch 50, attached to side 18, has vertical leg 53 and horizontal leg 51 with adjustable pin 52. When handle 43 is lowered into a position where its crosspiece 48 is under latch leg 51, handle 43 is pulled tightly and pin 52 is adjusted to press on crosspiece 48, holding it in place. Adjustability for differing thicknesses of plastic is provided for by the use of pin 52 which assures a tight seal of lid 14 to housing 12.

In the preferred embodiment there are two latch and handle assemblies 43, one each of parallel lid sides 15. The toggle lock illustrated is preferred, but other locking means may be substituted.

Gas delivery assembly 32 has nozzle 26, gas regulator 28, nozzle end 30, and tubing 68 (seen in FIG. 4.) Nozzle end 30 is shown adapted to fit a conventional tank of pressurized gas. Although a gas regulator 28 is shown mounted on device 10, such mounting is not necessary. Regulation may be provided on the gas tank itself. One advantage of teaching device 10 is that it may employ conventional pressurized gas or air and needs no other power source to run the device.

Lastly pictured in FIG. 1 is adjustable set screw 54 which is better explained with reference to FIG. 5.

Figure 2:
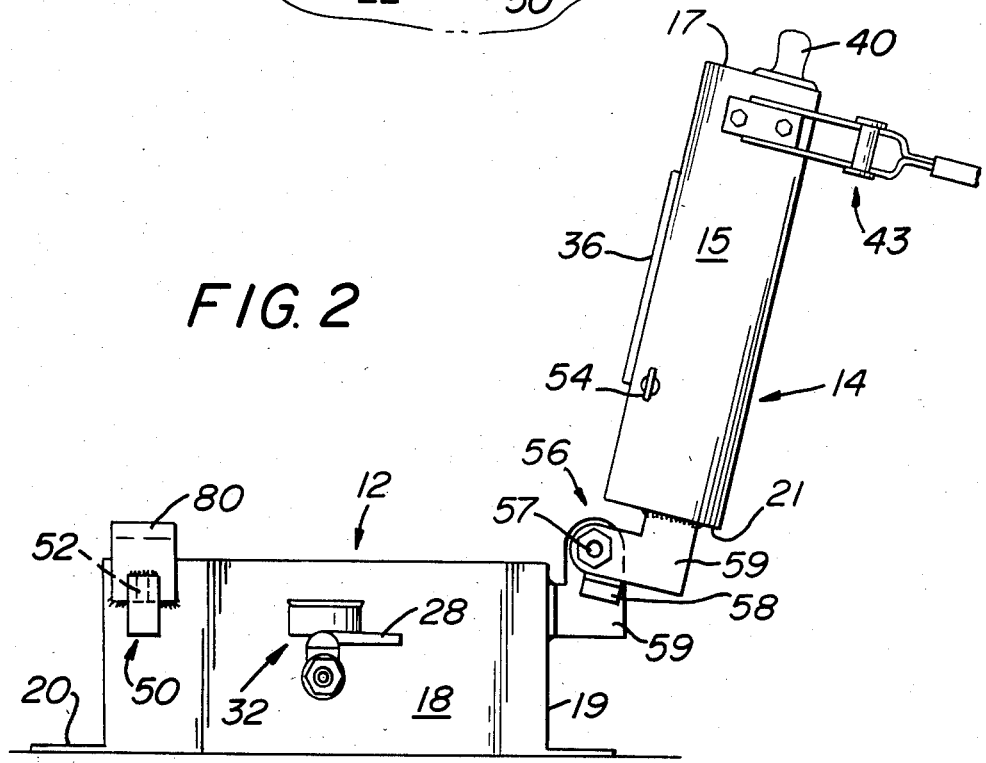
FIG. 2 is a side view of the housing of the invention with the lid open.

Now referring to FIG. 2, a side view of housing 12 and lid 14 with mold 36 in place is shown. Lid 14 has carrying handle 40 on lid side 17 and locking handle assembly 43 on lid side 15. Also shown on lid side 15 is set screw 54 which holds mold 36 in place (set screw 54 is best explained with reference to FIG. 5). On housing side 18 is seen gas delivery assembly 32 and latch 50. Seen in phantom in latch 50 is pin 52. Extending upward from side 18 is tab 80 which aligns lid 14 to housing 12 when lid 14 is closed. Also seen are flanges 20 used to stabalize device 10.

Of particular interest in FIG. 2 are hinges 56. Hinges 56 have L-shaped arms 59 which are preferably welded to lid side 21 and housing side 19. Arms 59 are rotatably joined to each other by pivot pin 57. Hinges 56 provide permanent but movable attachment of lid 14 to housing 12. Stop 58 prevents lid 14 from exceeding the position shown and also holds lid 14 in the open position for teaching purposes. In the preferred embodiment there would be two sets of hinges 56 as seen in FIG. 1.

Now referring to FIG. 3, a cross section of lid 14 and housing 12 is shown. Housing 12 is seen to have sides 18, shelf supports 72 and shelf 70. Coupled through one side 18 is gas delivery system 32 with gas regulator 28, nozzle 26, coupling 27, and tubing 68. Inside housing 12, tubing 68 is seen partially encased in cover 66. Pressurized gas delivered into tubing 68 is directed upward through shelf 70 into a softened plastic starting material, not shown, forcing the plastic starting material into mold 36 to form workpiece 100. All starting materials are pre-softened in an oven before use with device 10. In FIG. 3, the simplicity of the operation of this demonstrator is shown. It requires no outside power to run the device other than that easily provided by a portable pressurized gas tank (not shown) attached to end 30 of nozzle 26 (end 30 is seen in FIG. 1).

Also shown in FIG. 3 is mold 36 being held in lid 14 by lid lip 76. Lip 76 in the preferred embodiment is constructed of angle iron and circumscribes the entire inner circumference of lid 14. Mold 36 is seen to have two parallel plates, plate 37, preferably constructed of heavy wood board, and plate 75, preferably constructed of transparent plastic. The two plates are joined by bolts 74. It can be seen that plate 37 forms a frame around a central circular opening to allow the blown plastic to assume a dish shape. Plate 75 stops the blown plastic and gives a flat surface to the formed dish. It can be seen that some plastic will be blown toward the edges of plate 37, forming a lip to workpiece 100. Groove 38 in plate 37 allows the blown plastic to form a ridge; a ridge is important to ensure proper formation of a lip (the lip and ridge are best seen in FIGS. 6, 7, and 8.) A finished workpiece 100 also is seen better in FIGS. 6 and 7. Lid 14 has top 60 which has opening 34 with perimeter 33. Plate 75 is preferred to be transparent so that the students performing the operation of blow forming can see (through opening 34 in lid top 60) the plastic being blown into mold 36.

The sealing means of lid 14 to housing 12 may be viewed in FIG. 3. A tight seal is necessary to the process of blow forming so that the blown plastic does not escape through an opening between lid 14 and housing 12. Additionally, the pressure applied to the plastic should not be dissipated by allowing any of the pressurized gas to escape; all the gas should be directed to the plastic starting material. Thus, it is important that the toggle lock assembly 42 formed of handle 43, attached to lid side 15, and latch 50, attached to housing side 18, be capable of forming a tight seal regardless of the thickness of the plastic being used. For this reason, latch 50 includes adjustable pin 52. When handle 43, with legs 44 and leg extensions 47 joined by pin 62, is lowered into position, crosspiece 48 is caught under horizontal leg 51 of L-shaped latch 50. Crosspiece 48 is prevented from slipping outward by vertical leg 53. Adjustable pin 52, extending through leg 51, presses down on crosspiece 48, holding it tightly, thus simultaneously holding lid 14 in a tight seal to housing 12.

Also seen are bracket 64 and bolts 65 which hold handle 43 to lid 14. Lower bolt 65 also strengthens the attachment of angle iron lip 76 to interior of lid 14. Seen behind latch 50 is tab 80 which allows the user to align lid 14 onto housing 12. Tab 80 is thus a convenience and not essential to the device's operation.

Now referring to FIG. 4, a cross section of teaching device 10 is seen. Lid 14 with top 60 having opening 34 formed by perimeter 33 is fitted with mold 36 resting on angle iron lip 76. Mold 36 has plates 37 and 75 joined by bolts 74. Workpiece 100 with lip 101 is seen formed inside mold 36. Also seen on lid 14 is lifting handle 40 attached to lid front. 17. Hinge 56 with L-shaped arms 59 joined by pin 57 is seen fastened by welding at points 103 and 104 to lid back 21 and points 105 and 106 to housing back wall 19. Although welding is preferred as shown, other means of fastening hinges 56 are possible. Seen in housing 12 is shelf 70 supported by circumferential lip 72. Additional cross supports 78 are seen holding shelf 70 across the width of housing 12. Also seen are external flanges 20 used to secure teaching device 10 to a counter or table surface for operation.

Now referring to FIG. 5, a partial cross section of side 15 shows the function of set screw 54. Screw 54 extends through lid side 15 to press against pressplate 82. Pressplate 82 is held to the inside of lid side 15 by rivet 84. When a mold 36 is in place, as seen in FIGS. 1, 3, and 4, plate 37 is held in lid 14 by lip 76 (seen in FIG. 4). To ensure that mold 36 remains tightly in lid 14 when lid 14 is lowered onto housing 12, pressplate 82 is tightly pressed to plate 37 by set screw 54. To remove mold 36 from lid 14, set screw 54 is loosened. Thus extra means are thereby provided to assure a close fit of the mold.

Now referring to FIGS. 6 and 7, a finished workpiece 100 is shown. Workpiece 100 is formed by blowing plastic, such as acrylic plastic, into mold 36 as seen in FIGS. 1, 3, and 4. Finished workpiece 100 comes from mold 36 with lip 101. To create a bowl with a narrow rim 102 after molding, lip 101 may be trimmed after molding around ridge 107, producing the finshed product as seen in FIG. 7. To aid in trimming, there is preferably a groove cut into all molds. This groove (groove 38 in mold 36 shown in FIGS. 3 and 4) leaves a ridge (ridge 107 in piece 100) in the formed workpiece; the ridge, when trimmed produces a rim on the dish (rim 102 on dish 100).

Now referring to FIG. 8, an exploded view of an alternate mold 86 and its workpiece 88 is seen. Mold 86 is formed of two plates, plate 92 which has a central opening 91 to receive blown plastic, and plate 90 which has divider bar 94. Plates 90 and 92 are joined by bolts 97 and nuts 96. Additionally, screws 98 are inserted for tight seal of plates 90 and 92 to each other. A tight seal is necessary between plates 90 and 92 to prevent escape of pressurized gas or misplacement of blown plastic. It is seen that plate 90 has a set of spaced apart apertures 95 forming an X in the middle of the plate 90. Apertures 95 allow plastic blown upward into mold 86 to enter opening 91 of plate 92 to form workpiece 88. Additionally, plate 90 has divider bar 94 which fits into slots 93 of plate 92. Divider bar 94 urges the blow plastic into the configuration of a divided dish when forming workpiece 88, the formed divider 89 serving to divide dish 88 into two sections. Also, groove 110 on mold 92 accepts plastic to form a ridge, seen on workpiece 88 as ridge 109. As with the finished workpiece 100 seen in FIGS. 6 and 7, finished workpiece 88 is trimmed around ridge 109, removing excess lip 108 to form a rimmed dish. Both molds 36 and 86 work in the same manner as just described. That is, they each have plates which frame an opening in which a circular workpiece is formed. It should be appreciated that a mold with a framed opening of another shape would produce a workpiece having the general shape of that particular opening.

There are many variations which may be practiced within the scope of this invention. Chiefly, there may be utilized any number of different molds to produce a variety of workpieces. As long as each mold is adapted to fit tightly in the lid in the manner described, such mold is intended to be in the scope of this invention. Also, any locking assembly which provides a tight fit of lid to housing is within the scope of this invention. Although it is preferred that the device be secured to a work surface, the device operates without any attachment and such attachment is not necessary. Also, although it has been shown that gas delivery assembly 32 includes gas regulator 28 mounted to device 10, such mounting is not necessary and a regulator may be provided with the gas tank itself. Additionally, the gas delivery assembly 32 with nozzle and tubing may be varied as long as gas under pressure is delivered to the orifice.

Several different means of attachments have been shown to hold various mold sections together and to secure parts of the device to each other, any secure fastening means are within the scope of this invention. Any suitable material of construction may be employed as long as it is rigid enough to stand the pressure and maintain a proper seal. Metal or a combination of metal, wood, or plastic is suitable. Also, while a parallelpipedal housing is illustrated, it is intended that the scope of this invention include other shapes, so long as the housing function of support and seal is maintained. The device may use any plastic starting material as long as it is amenable to blow molding. Acrylic plastic is commonly used and is preferably prewarmed in an oven to soften it for the blow molding process.

There are many advantages to the teaching device of this invention. First, this teaching device provides "hands on" learning experience for the student in the art of blow forming of plastics. Second, the device is portable; it may be used in the ordinary classroom and be carried from room to room. Third, by means of the lid opening, the student may watch the process of blow forming of plastics.

Having now illustrated and described my invention, it is not intended that such description limit this invention, but rather that this invention be limited only by reasonable interpretation of the appended claims.

What is claimed is:

1. A generally portable student teaching device to demonstrate pressure blow forming comprising:
    a. a generally parallelpipedal and sealable housing, said housing including a bottom, a lid including means to receive a mold, and four sides;
    b. means to sealably lock said lid to said housing;
    c. shelf supports located proximate said housing sides' interior upper edges;
    d. a generally horizontal planar shelf sized to span transversely the area defined by said four sides and rest on said supports, said shelf adapted to receive thereon plastic starting material, said shelf including an orifice to direct a jet of pressurized gas upward vertically through said shelf into said starting material; and,
    e. means located on one of said sides to receive gas under pressure,
    so that softened plastic starting material, when placed over said orifice on said shelf in said sealed housing, may be blown upward by pressurized gas to form thereby a workpiece.

2. The teaching device according to claim 1 wherein said means to receive pressurized gas includes:
    a. a nozzle, one end of said nozzle adapted to receive an exterior source of pressurized gas, said nozzle other end coupled through said housing side to tubing;
    b. tubing inside said housing connecting said nozzle to said shelf orifice to form a gas line.

3. The teaching device according to claim 1 wherein said lid includes a central opening for observation of the blow form process.

4. The teaching device according to claim 1 wherein said lid's mold receiving means is a circumferential interiorly disposed lip.

5. The teaching device according to claim 4 wherein said lid's lip is angle iron secured to said lid circumferentially.

6. The teaching device according to claim 4 wherein said teaching device includes additionally at least one removable mold, said mold adapted to be received by said lid's circumferential lip.

7. The teaching device according to claim 6 wherein said mold includes a contiguous frame sized to rest on said lid's circumferential lip and a central cavity to receive said blown plastic.

8. The teaching device according to claim 1 including additionally means to secure said housing to a flat surface for stability during use.

9. The teaching device according to claim 1 wherein said lid is fastened to said housing by at least one set of L-shaped hinges, said hinges including a stop.

10. The teaching device according to claim 1 wherein said lid locking means is at least one toggle lock assembly having a handle and a latch, said handle and latch located in vertical alignment on said lid and said housing respectively.

11. The teaching device according to claim 10 wherein said device has two toggle lock assemblies positioned in vertical alignment on parallel sides of said housing and said lid.

12. The teaching device according to claim 10 wherein each latch includes means to adjust for differing thicknesses of plastic.

13. The teaching device according to claim 11 wherein on each housing side which includes a lock, there is additionally a vertical tab extending above said housing proximate said lock, said tab aligning said lid with said housing.

14. The teaching device according to claim 1 including additionally means to tighten said mold in said lid.

15. The teaching device according to claim 13 wherein said means to tighten said mold in said lid is a set screw and pressplate.

16. A generally portable teaching device to demonstrate pressure blow forming of plastic comprising:

a. a generally parallelpipedal sealed housing, said housing including a bottom, a lid with a central opening and an interiorly disposed circumferential lip to receive a mold, and four sides, one of said sides including an orifice to receive a gas jet nozzle;

b. at least one toggle lock assembly having a latch and a handle to seal said lid on said housing, said latch located on a housing side and said handle located on said lid in vertical alignment with said latch;

c. shelf supports interiorly disposed and circumscribing said housing sides proximate said housing sides' upper interior edges;

d. a generally horizontal planar shelf adapted to rest on said shelf supports and to receive thereon a softened plastic starting material, said shelf including an orifice to direct a jet of pressurized gas upward vertically through said shelf;

e. a gas delivery assembly to deliver pressurized gas to said shelf orifice; and, f. at least one removable mold, said mold sized to be received on said lid's circumferential lip, so that when a user places an amount of softened plastic starting material on said shelf and secures said lid, with said mold in place, pressurized gas flowing upward through said shelf orifice blows said plastic material into said mold to form thereby a blow formed molded workpiece.

* * * * *